United States Patent Office 3,245,800
Patented Apr. 12, 1966

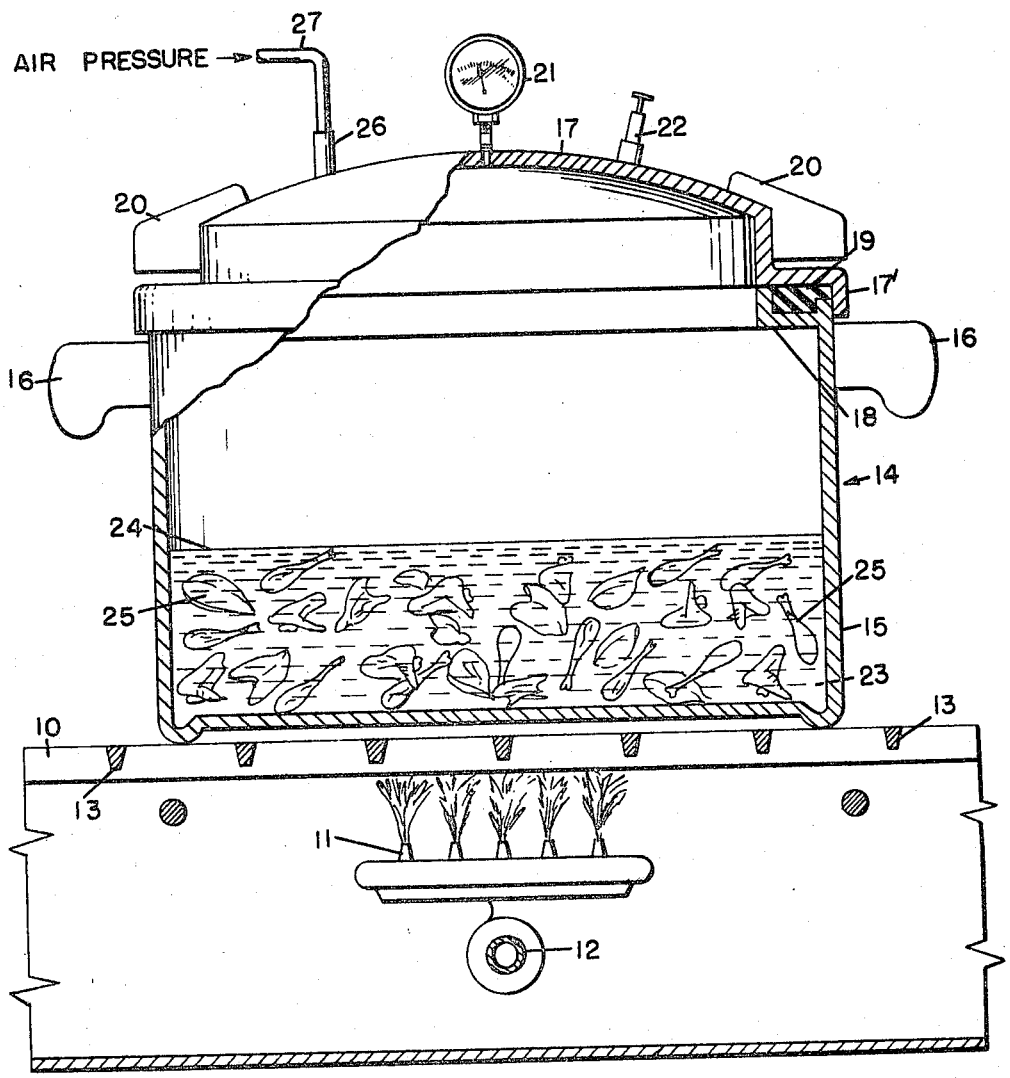

1

3,245,800
PROCESS OF PRODUCING FRIED CHICKEN UNDER PRESSURE

Harland Sanders, Shelbyville, Ky., assignor, by mesne assignments, to Kentucky Fried Chicken Corporation, Shelbyville, Ky., a corporation of Kentucky
Filed Sept. 26, 1962, Ser. No. 226,319
2 Claims. (Cl. 99—107)

The present invention relates to a method or process for producing fried chicken under pressure and constitutes a continuation-in-part of my copending application, Serial No. 610,965, filed September 20, 1956, now abandoned.

Generally the process contemplates the deep-fat frying of chicken under accurately controlled conditions of temperature, pressure, time, sizes of serving pieces, and amount and composition of breading used, for the purpose of producing superior taste, texture and appearance in the finished product.

I have found that chickens weighing between 2¼ and 2½ pounds dressed and cut into 8 to 10 serving pieces and correctly breaded should, for best flavor, texture and appearance, be dropped into relatively hot fat (350° to 400° Fahrenheit) to start the browning of the breading and to seal the exterior of the serving piece against loss of its natural juices. The cold chicken quickly (in 1 to 2 minutes) lowers the temperature of the accurately measured quantity of fat to a temperature of 250° F. Then the chicken should be cooked for about 8 minutes under about 15 pounds per square inch of gauge pressure to maintain the 250° F. cooking temperature without further loss of moisture from the breading and without any drying out of the chicken pieces.

It is accordingly an object of the invention to provide a novel process for quickly and thoroughly frying chicken under pressure in a manner to seal in substantially all the natural juices while browning the breaded surface thereof to desired crispness and appearance.

It is another object of the invention to provide such a process in which the time, temperature and breading composition are so correlated to the sizes of the serving pieces that optimal taste, appearance and texture of the cooked chicken are produced.

A further object of the invention is to provide a method of the character described in which air under pressure may be introduced under certain circumstances to prevent loss of natural juices from the chicken pieces.

Other and further objects of the invention will become apparent from a reading of the following specification taken in conjunction with the drawing, in which:

The figure is a vertical sectional view illustrating a pressure cooker upon a source of heat and serving to illustrate the process hereinafter set forth.

Referring to the drawing, there is shown therein a stove generally indicated at 10 provided with a gas burner 11 supplied with fuel by means of a supply pipe 12 and provided with a grill 13 upon which is mounted a pressure cooker generally indicated at 14.

The pressure cooker consists of a receptacle 15 provided with handles 16 and a cover 17 having the customary flange 17' superposed over an inwardly extending flange 18 of the receptacle 15. Between the flanges 17' and 18 is interposed a gasket 19.

The cover 17 is provided with handles 20, a pressure indicating gauge 21 and a pressure controller 22. There is also provided in the cover 17 a fitting 26 to which an air hose 27 is connected, the air hose leading to an air pump or the like (not shown).

Seen within the container is a quantity of grease or the like indicated at 23, the level of such grease being indicated at 24 and immersed in the grease 23 there are shown pieces of chicken 25.

2

In carrying out the present process, it should be borne in mind that when water, for example, is brought to a steam pressure at 29.7 p.s.i.a., or fifteen pounds above atmospheric pressure at sea level, that the boiling point of such water is now 250° Fahrenheit compared with 212° Fahrenheit at atmospheric pressure and that this 38° Fahrenheit differential between the normal boiling point and fifteen pounds pressure above normal results in cooking speeds from two to ten times faster than that possible with other methods.

In the present case, grease, oil or other cooking compound is first placed in a container and then brought to a temperature of 350° to 400° Fahrenheit after which raw chicken, separated into its usual component parts and coated with a moist layer of breading material of predetermined average thickness and moisture content and seasoned, is placed in the cooking compound whereupon the latter drops to a temperature of from 250° to 275° Fahrenheit. The lid is then sealed upon the container and the pressure allowed to build up to approximately fifteen pounds above atmospheric pressure or approximately double the atmospheric pressure. This building up of pressure usually takes from one and one-half to two minutes. With the pressure remaining at fifteen pounds above atmospheric pressure or approximately double the atmospheric pressure, the temperature of the cooking compound will perforce remain at approximately 250° Fahrenheit. This temperature and pressure are maintained for a period of about eight minutes after the cooking compound has reached approximately 250° Fahrenheit whereupon the pressure may be released and the chicken then removed wholly cooked.

A typical operation employing the herein disclosed process will now be described. Two chickens each weighing from 2¼ to 2½ pounds are cut into from 16 to 20 serving pieces. The pieces are immersed in a dip made of skimmed or reconstituted skimmed milk and whole eggs (approximately eight per gallon of milk). The dipped pieces are then rolled in flour to which has been added salt and other seasoning ingredients.

The approximately 4½ to 5 pounds of breaded pieces are dropped into the cooker 14 in which seven to eight quarts of cooking fat have been brought temporarily to a temperature of about 400° F. The chicken and fat are stirred a few seconds and the cover 17 is promtply applied. The hot fat quickly brings the moisture in the breading coating to the normal boiling point and thus starts building up the pressure within the cooker 14 while the cooling effect of the steam generation quickly lowers the fat temperature to about 250° F., taking from 1½ to 2 minutes. Since this temperature corresponds to a gauge pressure of 15 pounds per square inch, further desiccation of the breading is arrested at this time, but its desired final crispness and color have already been determined.

The burner 11, which had been turned to high heat during the short browning and sealing period, is now turned to its low cooking setting which maintains the desired temperature of 250° F. and pressure of 15 pounds per square inch above atmospheric pressure. After eight minutes the pressure is released and the cooked chicken is removed for serving or storing in a warming oven maintained at 160° F.

Chicken so cooked will keep well for many hours in such an oven without loss of flavor, texture or appearance. It is also not greasy since the carefully balanced temperatures and pressures maintain optimal moisture content in the breading, thus excluding the fat that would otherwise soak therein.

The moderate cooking temperatures not only provide improved flavor and color in the chicken but also con- ...ve fat by preventing the breaking down thereof that ...uld otherwise rapidly occur at temperatures above 0° F.

For larger quantities of chicken, a larger cooker and/or ...oportionately more cooking fat would be used. For ...oking smaller quantities, it is desirable to have the fat ...a lower temperature at the beginning of the operation. ...r example, to cook one chicken, the temperature ...ould be about 370° F. so that the bath temperature ...n be lowered to the desired 250° F. and 15 pounds ...uge pressure in the two minutes allowed for the brown-...; and sealing phase of the process.

If for any reason the temperature and pressure should ...l to be lowered to the desired values in two minutes, ...mpressed air will be introduced into the cooker 14 ...ough the conduit 27 in quantity and at the pressure ...cessary to arrest further generation of steam by evapo-...ion of more water and juices from the breading and ...icken. Thus undesirable drying out of the breading ...d chicken will be prevented. The air pressure will ex-...d 15 pounds per square inch gauge at least by an ...ount to match the vapor pressure of water at the ...vated temperature, and the cooking time can be re-...ced proportionately to avoid overcooking and an at-...dant increase in toughness and stringiness of the ...duct.

It will be found that chicken fried in this manner rely-...; upon steam with or without added air pressure is not ...ly tender and tasty but of a golden brown color and ...t a deep brown or black which is often the case where ...ntinued heat must be applied at normal temperatures. ...e invention contemplates that the moisture from the ...) and breading under the present process will normally ...ovide the necessary steam within the container whereby ...raise the pressure within the container as above set ...th.

The present process also contemplates the use of spices ...d seasonings applied to the chicken in the form of ...ading prior to being placed within the cooking com-...und and it will be apparent that because of the pres-...e applied during the frying process of the present in-...ntion the meat of the chicken will become more thor-...ghly impregnated with such spices and seasonings as a ...ult of the pressure applied during the frying process. ...will also be apparent that the natural juices and flavor ...the chicken fried in the manner stated above will be ...led into the meat and not be lost either into the atmos-...ere or into the cooking compound as is ordinarily the ...e.

While but one form of the invention has been shown and described herein, it will be readily apparent to those skilled in the art that many minor modifications may be made without departing from the spirit of the invention or the scope of the appended claims.

What is claimed is:

1. A process of frying chicken, comprising: cutting raw chicken into serving pieces, coating said serving pieces with a moist layer of breading material of predetermined average thickness and moisture content, wholly immersing said serving pieces in a bath of liquified cooking fat heated in a pressure cooking vessel to a temperature between 350° and 400° F., hermetically closing said cooking vessel, reducing the temperature of said cooking fat rapidly to a cooking temperature of from 250° to 275° F. in a time period of the order of two minutes while the pressure in said cooking vessel rapidly builds up toward a cooking pressure of approximately 15 pounds per square inch above atmospheric pressure as a result of the conversion to steam of excess moisture in said layer of breading material, and cooking said pieces in said fat for approximately eight minutes at said cooking temperature and pressure, said cooking pressure being at least sufficiently close to the vapor pressure of water at said cooking temperature to substantially prevent boiling away of moisture from said pieces and said breading material, whereby the optimal moisture content is obtained therein at the termination of the frying process.

2. A process according to claim 1 in which air is introduced into said cooking vessel at the end of the browing and sealing portion of said process in sufficient quantity and at sufficient pressure to at least substantially equal the vapor pressure of water at said cooking temperature, so as to substantially prevent boiling away of moisture from said pieces and said breading material, whereby the optimal moisture content is obtained therein at the termination of the frying process.

References Cited by the Examiner

UNITED STATES PATENTS

| | | | |
|---|---|---|---|
| 2,778,736 | 1/1957 | Wagner | 99—107 X |
| 2,827,379 | 3/1958 | Phelan | 99—107 |
| 3,078,172 | 2/1963 | Libby | 99—107 X |

A. LOUIS MONACELL, *Primary Examiner.*

HYMAN LORD, *Examiner.*